United States Patent
Arpee et al.

(10) Patent No.: US 6,711,404 B1
(45) Date of Patent: Mar. 23, 2004

(54) APPARATUS AND METHOD FOR GEOSTATISTICAL ANALYSIS OF WIRELESS SIGNAL PROPAGATION

(75) Inventors: John Arpee, Herndon, VA (US); Stan Gutowski, Arlington, VA (US); Mustafa Touati, Herndon, VA (US)

(73) Assignee: Scoreboard, Inc., Herndon, VA (US)

( * ) Notice: Subject to any disclaimer, the term of this patent is extended or adjusted under 35 U.S.C. 154(b) by 434 days.

(21) Appl. No.: 09/620,850

(22) Filed: Jul. 21, 2000

(51) Int. Cl.⁷ .................................................. H04Q 7/20
(52) U.S. Cl. .................... 455/423; 455/67.11; 455/446; 455/67.16
(58) Field of Search ................................ 455/423, 446, 455/67.1, 456, 447, 67.16

(56) References Cited

U.S. PATENT DOCUMENTS 5,465,390 A * 11/1995 Cohen
5,926,762 A * 7/1999 Arpee et al.
5,987,306 A * 11/1999 Nilsen et al.

OTHER PUBLICATIONS

ETL 1110–1–175 (Jun. 30, 1997) "Engineering and Design—Practical Aspects of Applying Geostatistics at Hazardous, Toxic and Radioactive Waste Sites"; Chapter 2 entitled "Technical Aspects of Geostatistics" pp. 2–1 to 2–17.

* cited by examiner

Primary Examiner—Sinh Tran
Assistant Examiner—Huy D Nguyen
(74) Attorney, Agent, or Firm—Duane Morris LLP

(57) ABSTRACT

A method utilizing statistical interpolation techniques to analyze and simulate the spatial variability and continuity of radio frequency data collected from a wireless cellular system. The method is used for cellular system planning and management. After installation and setup of cellular base stations, further analysis and refinement of RF data is implemented to determine signal coverage of the tower, location of RF holes in system, reuse of frequencies, and overlapping RF signals between two or more towers causing interference. The method analyzes raw RF power data that is collected by drive testing a sample of roads in a cellular system. A geostatistical model of the RF propagation at a cellular system is determined through kriging. The RF path loss trend estimation is extracted from each the raw data and modeled to describe data variability across the entire cellular system ares. An estimated path loss signal map is then prepared for any area of interest within a cellular system.

17 Claims, 13 Drawing Sheets

APPARATUS AND METHOD FOR GEOSTATISTICAL ANALYSIS OF WIRELESS SIGNAL PROPAGATION

FIELD OF THE INVENTION

The present invention relates to cellular telephone systems and to modeling cellular telephone systems for optimizing utilization of the available overall radio spectrum. More particularly, the present invention relates to using measured network data and geostatistical modeling techniques to manage variations and growth within a cellular system and provide improved frequency plans for cellular networks under different variables.

BACKGROUND OF THE INVENTION

The service area of a wireless communications system is partitioned into connected service domains known as cells, where radio telephone (cellular) users communicate, via radio links, with the base station serving the cell. The cells can be further partitioned into sectors. The base station is coupled to the public service telephone network (PSTN).

Presently available commercial mobile communication systems typically include a plurality of fixed cells each of which transmits signals to and receives signals from mobile units within their respective service areas. In AMPS or FDMA systems, each base station is assigned a plurality of channels (each 30 KHz wide) within a frequency spectrum over which it can communicate with mobile units. A mobile unit within range of the base station communicates with the base station using these channels. Typically, the channels used by a base station are separated from one another in some manner (typically skipping 1, 7 or 21 intermediate channels) sufficiently that signals on any channel do not interfere with signals on another channel used by that base station. To accomplish this, an operator typically allots to a base station a group of channels each of which is widely separated from the next. So long as a mobile unit is within the area in which the signal from a base station is strong enough and is communicating with only that base station, there is only a slight probability of interference with the communication. The present invention will also operate with GSM and iDEN systems which do not rely on the same frequency divisions multiple access method.

In a common type of mobile system called Time Division Multiple Access (TDMA), which includes IS-54 and IS-136, GSM and iDEN each frequency channel is further time divided into additional channels within each frequency. Each base station sends and receives in bursts during some number of different intervals or time slots. These time intervals within frequency bands then effectively constitute the individual channels. In order to distinguish the channel divisions within a frequency and to distinguish channels of a common frequency between overlapping cells digital codes are used. For example, IS-136 utilizes Digital Verification Color Codes unique to a channel at a cell, are used. GSM uses Base Station identification codes.

In order to allow mobile units to transmit and receive telephone communications as the units travel over a wide geographic area, each cell is normally physically positioned so that its area of coverage is adjacent to and overlaps the areas of coverage of a number of other cells. When a mobile unit moves from an area covered by one base station to an area covered by another base station, communications with the mobile unit are transferred (handed off) from one base station to another in an area where the coverage from the adjoining cells overlaps. Because of this overlapping coverage, the channels allotted to the individual cells are carefully selected so that adjoining cells do not transmit or receive on the same channels. This separation is typically accomplished by assigning a group of widely separated non-interfering channels to some central cell and then assigning other groups of widely separated non-interfering channels to the cells surrounding that central cell using a pattern which does not reuse the same channels for the cells surrounding the central cell. The pattern of channel assignments continues similarly with the other cells adjoining the first group of cells. Often adjacent or overlapping cells will transmit on the same frequency and both will be received by a mobile wireless unit. However, because of the digital codes identifying each channel, the mobile wireless unit can process the appropriate signal and ignore any additional reception.

Geostatistics is a "spatial statistics" tool that can be applied to any practical problem of 1D, 2D, or 3D predictions of a random variable. In addition, it can be applied to 4D predictions of spatio-temporal geostatistics monitoring through time. Geostatistics has been used since the early 1950's for mining engineering, mainly for determining ore reserves estimations and exploitation scenario simulations. Data collected in mining consists of soil cores and cuttings from a limited number boreholes, as well as samples from outcrops. In the early 1960's a basic theoretical framework of geostatistics had been built that set new standard techniques in the mining industry. Over the past 30 years, this theoretical framework has been strengthened and successfully applied for other types of problems such as fluid flow modeling and subsurface wave propagation. The new applications allow the development of new solutions and new concepts within the framework of an advanced geostatistical theory. The objective of these new developments aim to combine "spatial statistics" and "differential equations" describing the behavior of a physical phenomenon. Today, geostatistics is widely recognized as a tool for accurate spatial estimation. Geostatistics has the correct tools to quantify uncertainty and therefore it is considered as a risk assessment tool for field development managers of related industries. Geostatistics has been applied to numerous industrial problems ranging from classical problems of mining oil and gas engineering to more complex and challenging problems such as pricing in a stock market.

SUMMARY OF THE INVENTION

Path loss is the attenuation that occurs as RF signals propagate from a transmitting antenna to a receiving antenna. Path loss data sampling, acquisition, and estimation over a cellular network shows great similarities with standard problems encountered in ore-body or reservoir forecasting. Geostatistics has therefore high potential to be implemented for such purposes. The theory of geostatistics applied to physical phenomenon makes it appropriate to use for combining a propagation model and data measurements for wireless network. This application provides for efficiency in collection and maximum use of collected wireless data that results in precise predictions of missing data in a wireless network. The method quantifies and assesses errors due to any measurement or any estimation process. The method provides downscale information and gives RF engineers a high-resolution model describing the path loss over a given area of interest. The method simulates different scenarios of path loss before a drive or between successive drives that would lead to better strategies of data collection.

Geostatistical analysis techniques offer a way of describing the spatial continuity that is an essential feature of many natural phenomenon and provide adaptations of classical regression techniques to take advantage of this continuity. In geostatistics, the application of highly developed algorithms modified to the parameters of the provision of cellular service, as taught in the present invention, yields significantly enhanced results over other data smoothing techniques. The purpose of spatial continuity analysis is to quantify the variability of path loss measurements with respect to distance and direction. Geographic location is only considered if the data exhibit a trend, a property known as non-stationarity. Quantifying the spatial information involves comparing data values measured at one location with values of the same attribute measured at other locations. For example, two path loss measurements in close proximity are more likely to have similar values than two path loss measurements further apart. By determining the correlation with respect to separation distance, estimates of the unmeasured locations can be made based upon the values at the measured locations.

DETAILED DESCRIPTION OF EXEMPLARY EMBODIMENTS

Figure 1:
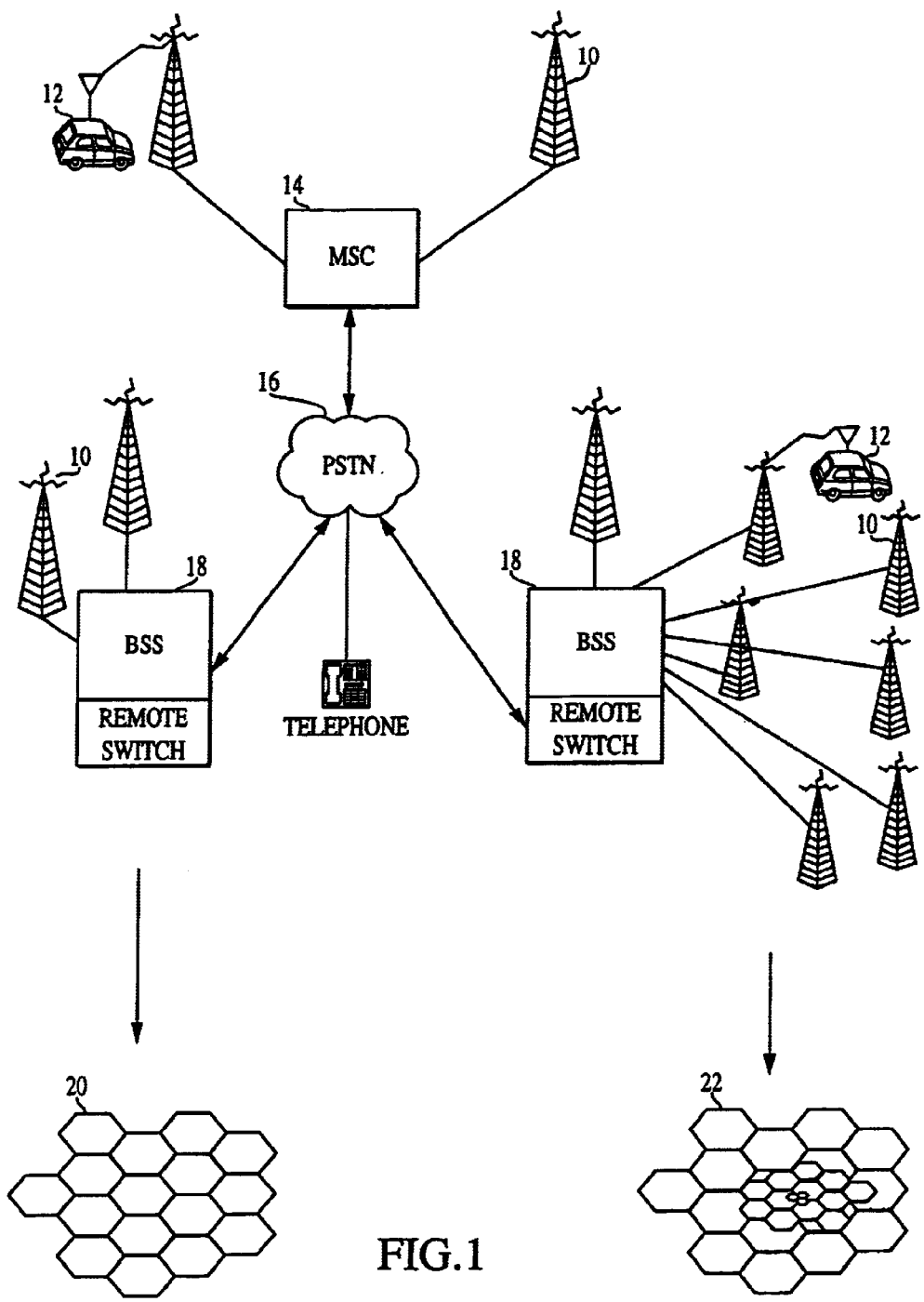
FIG. 1 is an exemplary illustration of a expanding cell coverage in a cellular telephone system.

A goal of planning and expansion for a cellular telephone system is to determine new base tower locations, and frequency reuse based on propagation distance of radio signals between base stations. RF data is gathered from the system to perform further analysis and refinement of channel traffic, interference, service area, and total propagation area of a base station. FIG. 1 is an exemplary illustration of a cellular telephone system. A plurality of antenna towers and base stations 10 are located within a geographic area. Calls from subscriber units 12 are directed through a mobile switching center (MSC) 14, which includes switching equipment needed to interconnect mobile equipment with the public services telephone network (PSTN) 16. Towers 10 tie into a base station switch (BSS) 18, which has a remote switch connected to the PSTN 16. Coverage of a wireless telephone system is typically illustrated with cells in the form of a honeycomb grid 20. When traffic within a base station's service area an antenna 10 becomes overcrowded and subscribers 12 experience an intolerable amount of busy signals or dropped calls, cell 20 division may be implemented to add channels within the system through additional base stations 10. The addition of base stations subdivides the existing cellular system into smaller cells 22, thereby creating greater channel capacity within a coverage area. However, adding channel capacity and balancing frequency reuse between base stations 10 adds complexity to engineering RF signal coverage within a system.

To add radio channels where spectrum allocation is limited, cellular providers reuse identical channels. The strategy for reusing channels is based on the fact that signal strength decreases exponentially with distance. Therefore, towers 10 that are far enough apart can use the same radio channels without causing interference with each other. Cellular system planning separates cell sites that use the same channels minimize interference.

Figure 2:
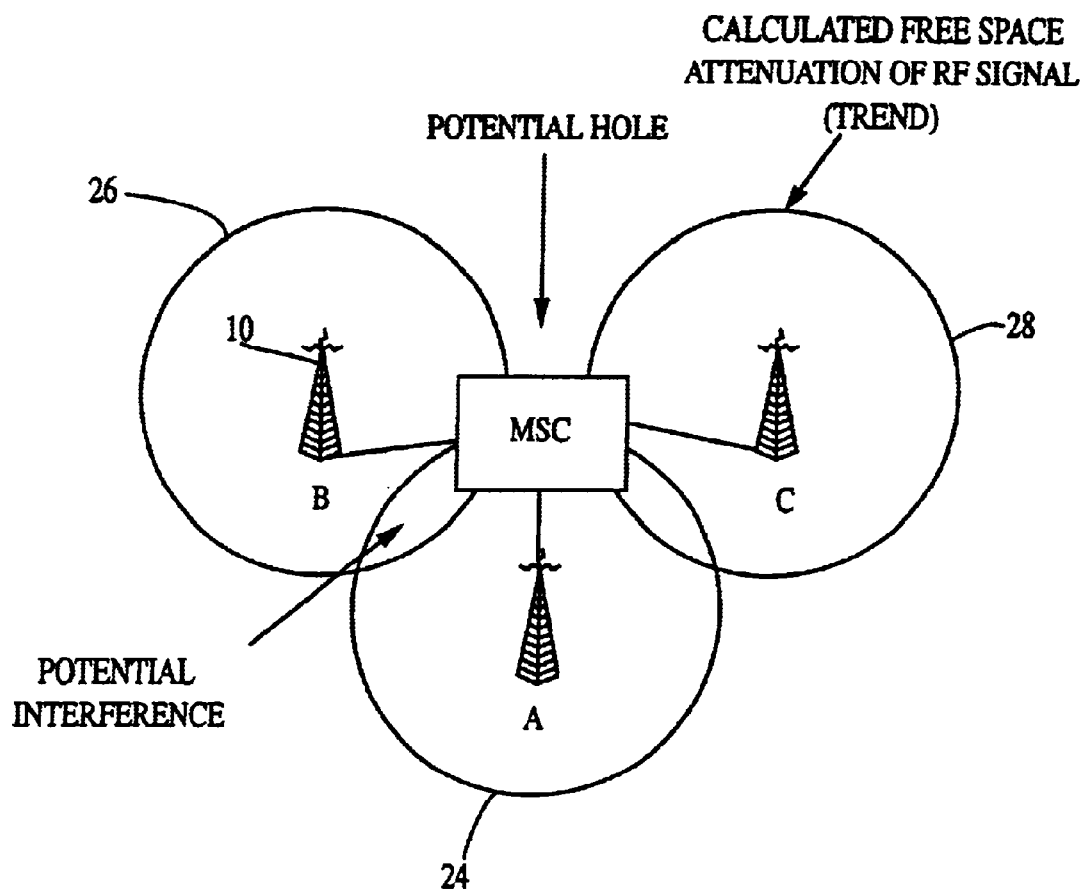
FIG. 2 is an exemplary illustration of radio coverage areas of a cellular telephone system.

FIG. 2 illustrates RF coverage areas for three exemplary base station cells. The calculated free space coverage of a cell is the theoretical attenuation limit of the RF signals without interference or blockage. Towers 10 are rarely placed to accurately account for all of the propagation factors that attenuate RF signals. Power levels and channel frequencies are typically adjusted after tower 10 installation. The radio coverage area for area cell A 24 partially overlaps cells B 26 and C 28. This overlap is a potential area for interference between identical channels. The radio coverage area for cells B 26 and C 28 have a hole between them. This hole is a potential area for dropped calls or lack of service coverage due to weak signals.

Figure 3:
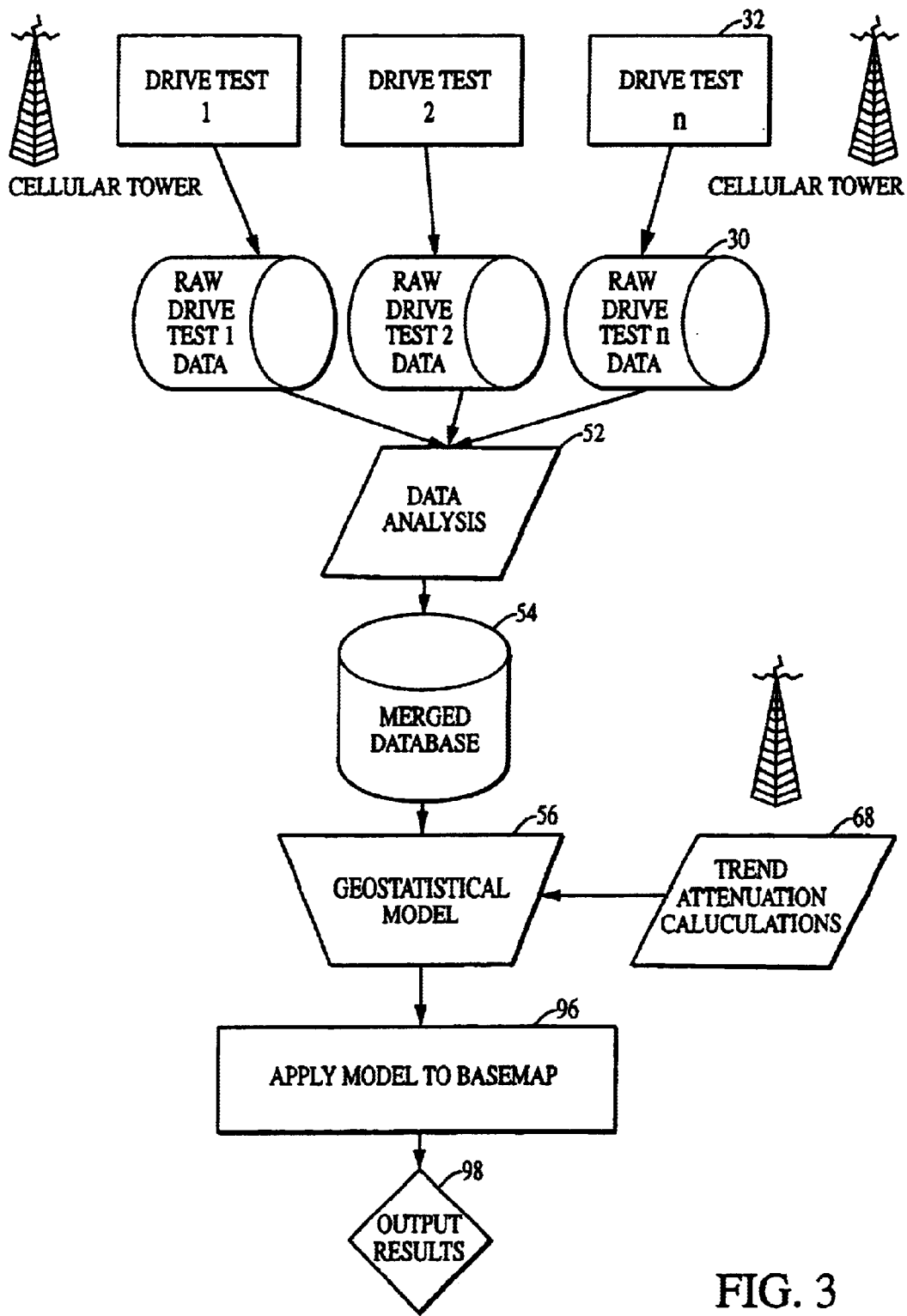
FIG. 3 is a flowchart of applying a geostatistical model to RF signal strength data.
Figure 4:
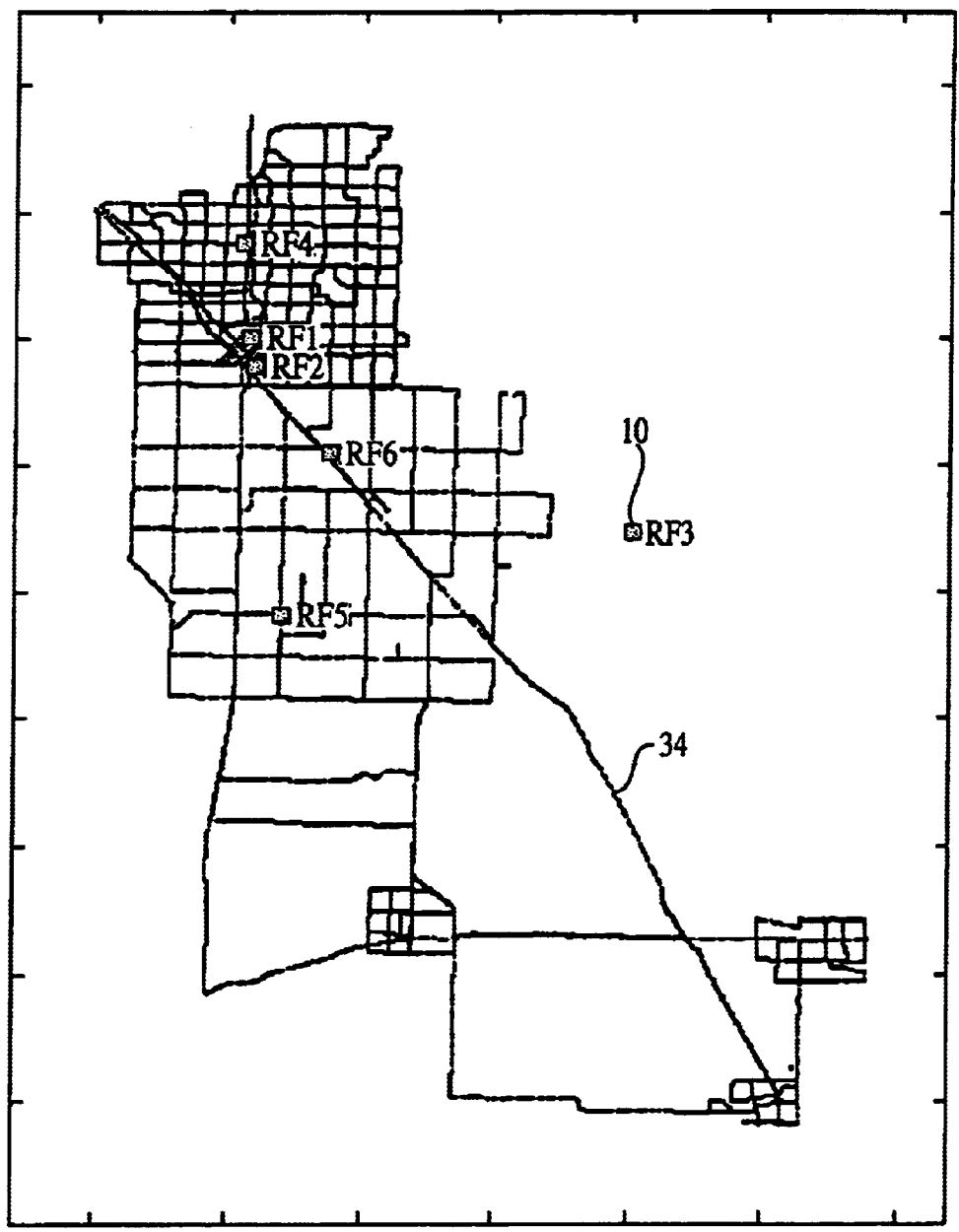
FIG. 4 is an exemplary basemap of a city illustrating the location of base tower sites in a cellular telephone system.

The flowchart of FIG. 3 generally illustrates the steps of the preferred exemplary embodiment of collecting RF data, modeling the data with geostatistics, and applying modeled parameters to a basemap of the system. To build a raw RF data set 30 from a cellular system, the data is first gathered through a drive test method 32. Collecting data 30 in a drive test 32 is described in copending application Ser. No. 09/567,709 Apparatus and Method for Non-disruptive Collection and Analysis of Wireless Signal Propagation, to the same assignee as the present application, and is incorporated herein by reference as if fully set forth herein. FIG. 4 illustrates an exemplary basemap of a city having six cell sites 10, RF1 through RF6. The drive plan 34 is a carefully determined route which will efficiently collect representative RF signal data from a cellular system. The drive plan 34 is established by evaluation of the distribution of the antennas 10 of the cellular system and through analysis of the geographical features of the area of the cellular system. As detailed in copending applications, a vehicle equipped with appropriate cellular signal receiving and measuring equipment is driven through the cellular system in accordance with the drive test plan 34 map to collect actual signal reception data 30. A statistically significant number of measurements are taken throughout the cellular system to determine the relative signal strength between each base station 10 and each mobile unit location.

A drive test 32 cannot cover all of the area of a cellular system. However, the present invention provides a method to find signal data 30 along the roads not covered by the drive plan 34. Total drive coverage is both impractical and impossible. Typically, an average of only 25% of the roads are covered in a drive test 32. It is impractical to cover all roads in a cellular system because of time and resource limitations. It is impossible because some parts of a cellular system are inaccessible due to natural and man made obstacles. The data 30 obtained by the drive test 32 process is also incomplete even in the areas tested because of the inherent imperfections of actual measurement conditions, even if parts of the drive plan 34 are driven multiple times.

Figure 5:
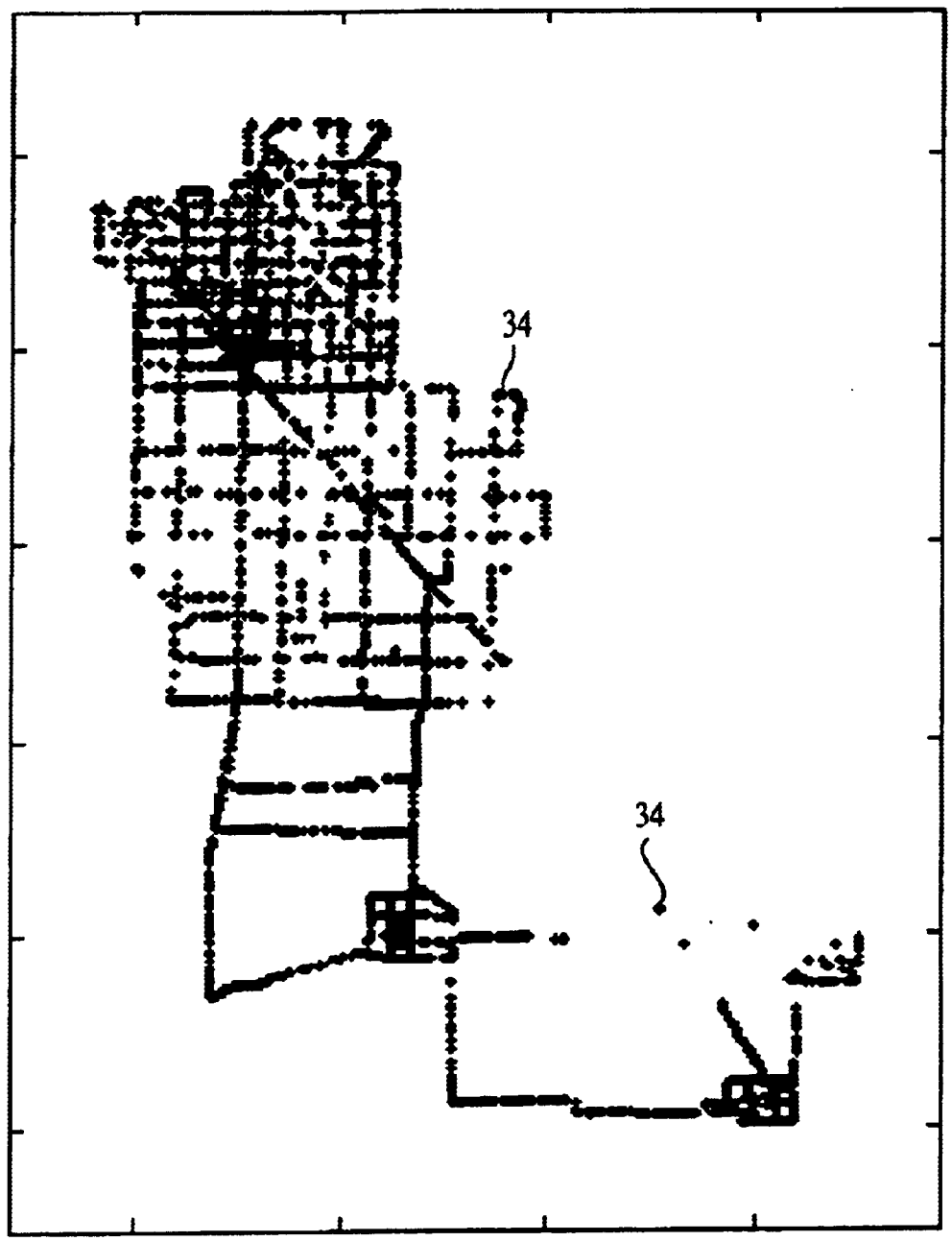
FIG. 5 is a graphical view illustrating exemplary successfully decoded digital code signals data obtained in an exemplary no key up drive test of the basemap in FIG. 4.

RF data 30 can be collected unobtrusively in a no key-up method rather than having to shut off channels, as described in copending application Ser. No. 09/567,709 Apparatus and Method for Non-disruptive Collection and Analysis of Wireless Signal Propagation to the same assignee as the present application and is incorporated herein by reference as if fully set forth herein. Digital channels send out color codes in each data frame that indicate the source of the channel. The location and color code data for each signal is gathered as raw cellular RF data 30 collected using a "no key up" method. The combination of channel number and color code creates an identification data point associated with a base station. If the color code can not be decoded during drive testing, the measurements are not able to associate the signal with the source base station. In CDMA, a PN code is the same concept as a color code. As the signal level drops, the ability to decode the color code correspondingly drops. Likewise, as interference increases, the probability of decoding the color code decreases. With the no-key up method, drive test 32 may yield data 30 displayed as data points in FIG. 5. The collection equipment must not only determine signal strength but must also decode the digital code associate with the signal which identifies the digital channel and/or sending antenna. Accurately decoding a digital signal is more difficult than reception of raw RF and requires a stronger and/or clearer signal reception.

Data points from multiple sectors are collected because they can exhibit different propagation characteristics normally found in RF measurement data. Propagation variations can be influenced by urban, suburban, and rural structural differences. In an urban environment, the signal typically propagates strongly along non-intersecting streets with the sector location, decaying rapidly away from the antenna, thereby exhibiting a "tunneling effect."

Figure 6:
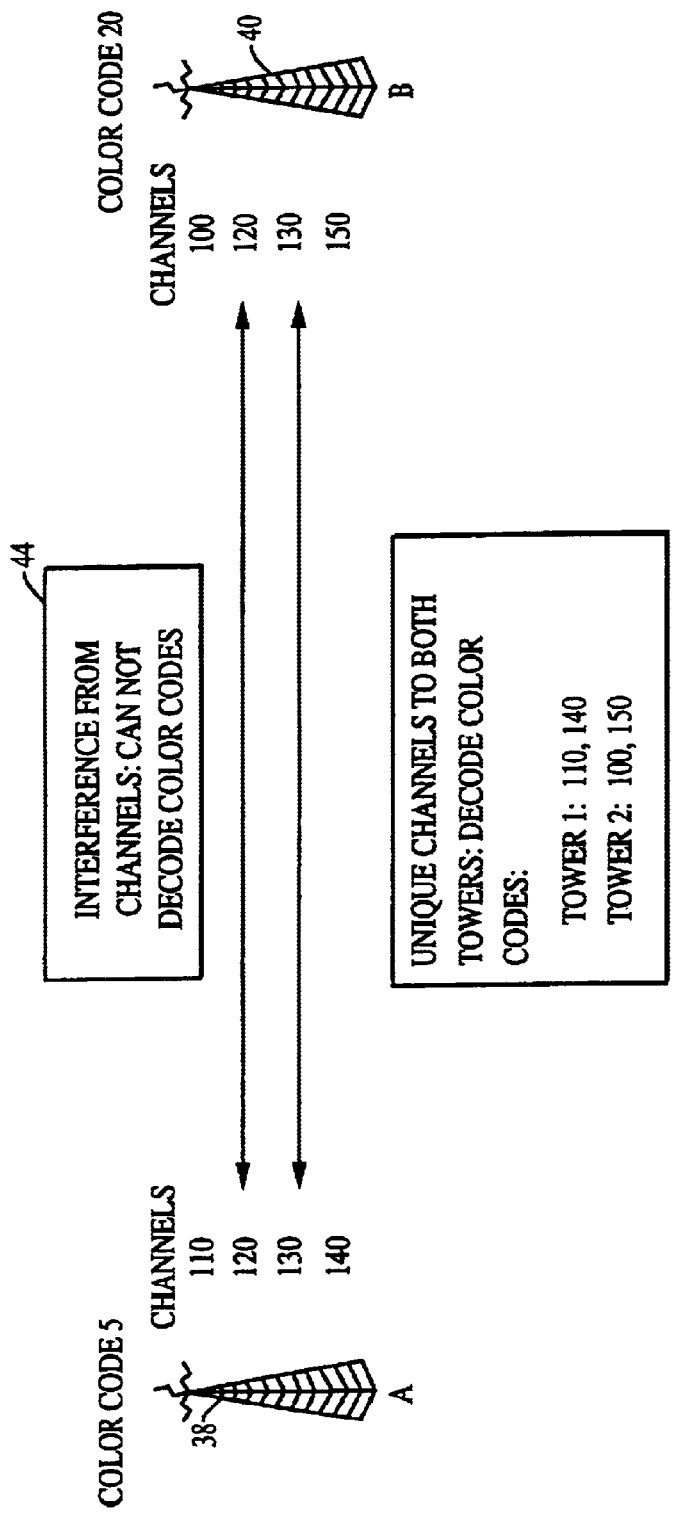
FIG. 6 is a tabular illustration of interference between channels in a cellular telephone system.
Figure 7:
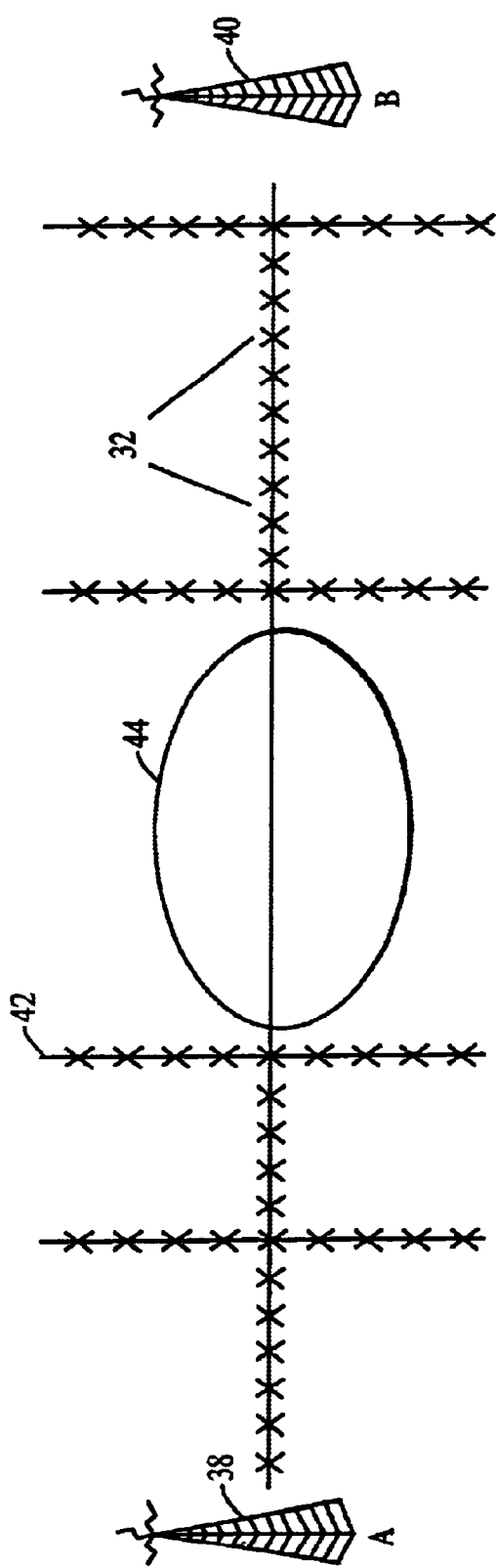
FIG. 7 is an exemplary illustration of gaps in RF signal strength data obtained in a drive test.

Exemplary illustrations of interference between two adjacent towers for a digital cellular system using DVCC are found in FIGS. 6 and 7. FIG. 7 illustrates the result of RF interference in FIG. 6. In FIG. 6, Tower A 38 transmits with color code five on channels 110, 120, 130, and 140. Tower B 40 transmits with color code 20 on channels 110, 120, 130, and 150. In FIG. 7, a drive test 32 along the roads 42 between the two towers 38, 40 gathers DVCC data 30 from both towers. Channels from the towers 38, 40 are unique except for channels 120 and 130. The color code from channels 120 and 130 can not be decoded due to interference between the similar channels. Therefore, the source of a signal on these two channels can not be identified even though a power level can be detected and a data gap 44 is formed. At similar power levels, a drive test 32 could collect a color code from channels unique to each tower. Each mark on a road 42 represents a data collection point from such signals. Where propagation signals from tower A 38 and tower B 40 intersect, interference could result in a data gap 44. Data 30 may have interference from identical channels, and a drive test 32 will collect a signal measurement but not decode the color code if significant interference exists between the identical channels, resulting in significant gaps 44 the data collection 30. The existence of gaps 44 in the collected data 30 gives rise to the need for the interpretation of the data 30 as taught in the present invention to fill in the gaps 44.

Figure 8:
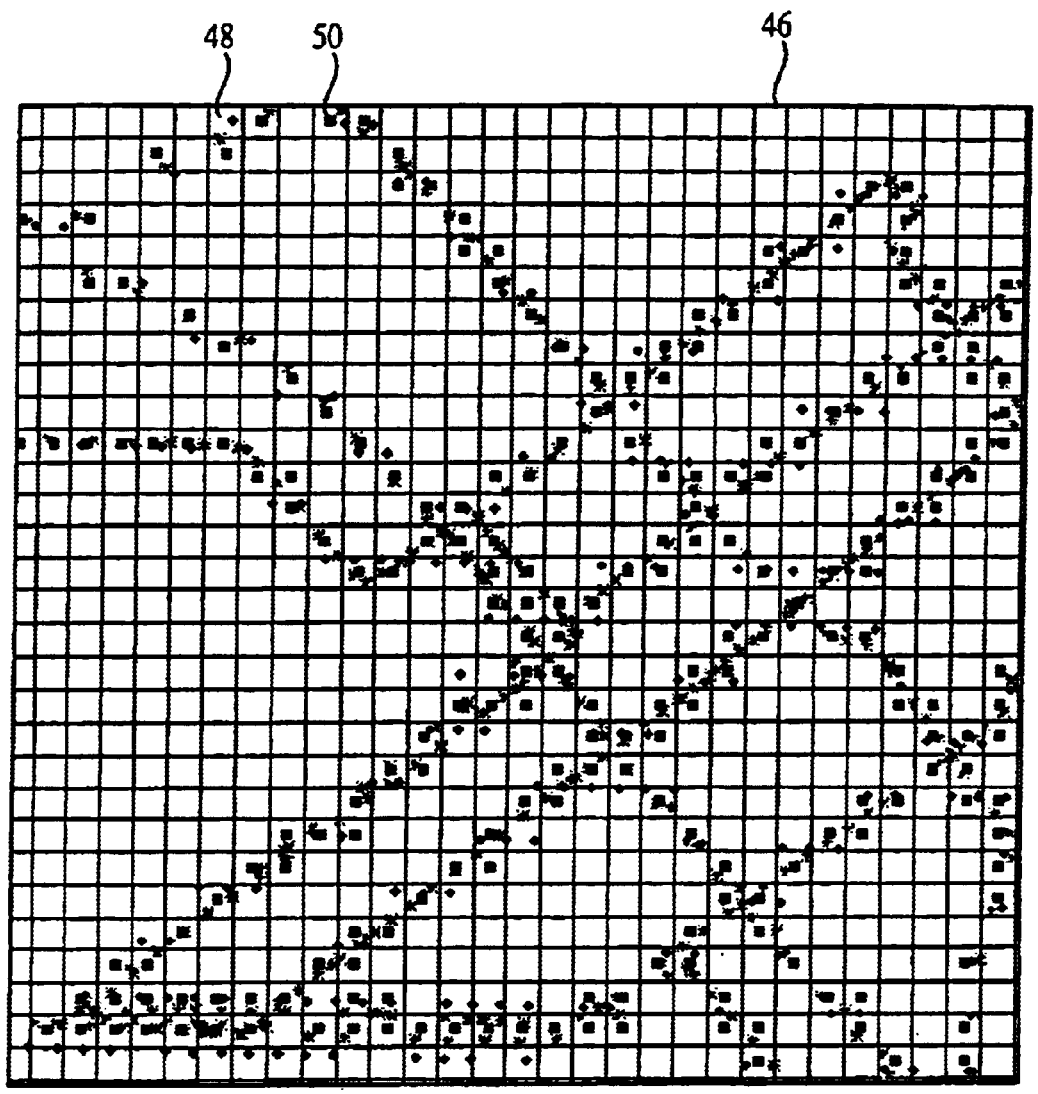
FIG. 8 illustrates the application of bins to the test area of the basemap in FIG. 4.

The measurement area in the system is divided into a grid 46 in FIG. 8. A grid is used to optimize data collection and sampling rates in a model. A bin 48 is one cell of the grid. Data analysis 52 of FIG. 3 includes the process of binning average values of RF data 30 within a grid cell 48 to a value 50 located in the center of each bin 48. Therefore, each bin location 48 analyzed has a single RF data value 50 representing all the RF values within that particular bin location 48. The averaging of the data 30 reduces distortions which could result from a greater number of measurements in some areas and a lesser concentration of measurements in other areas. When conducting a drive test 32, sampling is performed at a constant rate, however, the rate of travel of the sampling vehicle may vary and therefore a greater number of data samples 30 will be obtained in an area where the vehicle is traveling slower. In the exemplary embodiment, a 100 m×100 m grid 46 is overlaid onto the cellular system. The grid 46 size and shape can vary. Varying shapes and densities of bins 48 within a grid are possible and sometimes useful for dense distributions of data within a cellular system.

The next step of RF signal data analysis 52 is organizing the data. Data 30 collected from drive tests are organized and merged into a common database 54. A geostatistical model 56 is then built from the data in the merged database 54. A goal of the modeling step 56 is to create a geostatistical model that can estimate a value of a bin 48 based on the known values of surrounding bins 48 within a high degree of certainty. Generally, modeling 56 of cellular RF signals using geostatistical techniques comprises modeling known samples of data 30 to describe the variability of the data. The method of the preferred embodiment builds RF data models from a sample set of raw RF signals 30 produced by base stations 10 in a cellular system area. The models 56 are optimized to match measured data and show signal loss and radio interference beyond the sample data set, as well as co-channel interference.

Modeled wireless RF signal data 56 can show the existence of large-scale trend effects. At a lower scale level, data is assumed to be stationary. To estimate the path loss, two methods can be utilized: working with transformed data to a normal variable and kriging in the normal space then get back to the real space; and the preferred exemplary method of de-trending the RF data using an empirical trend estimate with the least square fit of the relationship "path loss" vs. "distance".

Figure 9:
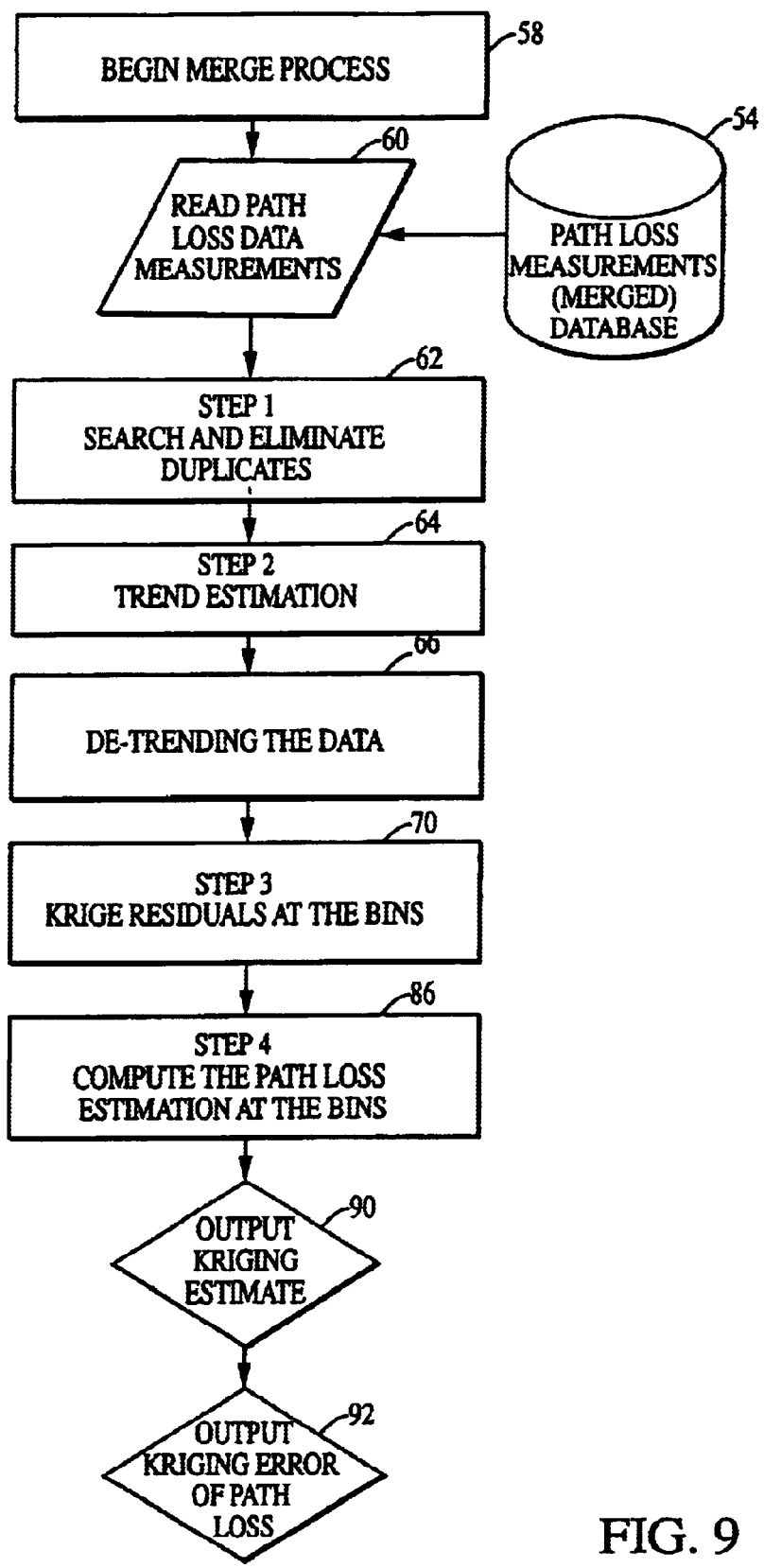
FIG. 9 is a flowchart of the merge process applying a geostatistical model to RF signal strength data.

The merge process 58, illustrated in the flowchart of FIG. 9, is a tool for RF path loss data pre-processing using the geostatistical modeling technique of kriging. For each sector at a base station 10, RF path loss measurements are given in raw format 54. Using the method of the exemplary embodiment, path loss measurements are processed in such a way to estimate a path loss at the bins 48 for the entire list of sectors at the global bin locations. The kernel of the merge process is the estimation workflow procedure found in Steps 1 through 4 on FIG. 9. It is mathematically consistent and is designed within the framework of geostatistics. The form of the kernel is based on estimating and filtering a lognormal path loss trend. The Best Linear Unbiased Estimator (BLUE), known as the kriging, is applied to compute residuals and the underlying uncertainty. Residuals are path loss data that have the natural attenuation of radio signals away from a base station removed from the path loss data measurement. The final results are called the kriging estimate and kriging error of the path loss. The estimator is a linear function of the data with weights calculated according to the specifications of unbiasedness and minimum variance.

The unbiasedness means that on the average the error of estimation is zero. Minimum variance means that the square estimation error is as small as possible. In selecting the weights of the linear estimator, kriging accounts for the relative distance of measurements from each other and from the location where an estimate is sought. The weights are determined by solving a system of linear equations with coefficients that depend on the variogram that describes the spatial structure of the data.

The basic merge loop begins with the step of reading the input data 60 from the path loss database and searching for duplicates 62 in the raw data 54. This data is read from the RF signal path loss measurements database 54 that was merged from the raw test drive data 30. The purpose of this step 60 is to eliminate any possibility of having non-reversible system matrix during the kriging. The data 54 will be treated in such a way that duplicated data elements are eliminated. Duplicate data may be due to overlapping drives or several measurements taken at the same location.

RF data 54 coordinates are measured according to either the local coordinates or global coordinates at a site and transferred to the basemap. Typically, either latitude and longitude or UTM-X and UTM-Y coordinate systems are used on the drive plan basemap 34. The number of bins 48 depend upon the input size of the grid 46 that overlays the basemap 34. The number, location, value and other parameters of input data elements 36 are all found from the records in the merged database 54 as organized for preprocessing.

Step two 64 of the merge process begins with the estimation of the trend via a least square mean fit algorithm and filtering the trend from the path loss. Trend is assumed to be a logarithmic function, which is a function of the physical phenomenon of RF signal attenuation. Attenuation of a wireless signal is the decrease of the signal strength exponentially with distance away from the signal source. Detrending of the data 66 is performed in order to split the deterministic and random part of the path loss. The simplest method for detrending data 66 is using ordinary least squares method. Therefore, at each bin 48 where a path loss value is located, the trend at the bin 48 is estimated by plotting the path loss versus the log of the distance and use a least squares regression method according to $$PLt = a\,Log_{10}d + b$$

where a is the slope of the line, b is the intercept, and PLt is the path loss trend. The trend-filtered data values are referred to as residuals. Residuals are generally found by Residual data=$Plm-PLt$ where Plm is the path loss measurement. In FIG. 3, the trend values are input 68 into the model separately from the merged database 54.

For each RF measurement point (xm,ym), x refers to the radial distance dm, where $$dm = [(xm-xrf)^2 + (ym-yrf)^2]^{1/2}$$

and y refers to the path loss measurements PLm (xm,ym). Computation of regression coefficients is as follows:

$$a = (SxxSy - SxSxy)/\Delta$$

$$b = (SSxy - SxSy)/\Delta, \text{ where:}$$

$$S = \sum_i 1/\sigma_i^2 \quad Sx = \sum_i x_i/\sigma_i^2 \quad Sy = \sum_i y_i i/\sigma_i^2$$

$$Sxx = \sum_i x_i^2/\sigma_i^2 \quad \text{and} \quad Sxy = x_i y_i/\sigma_i^2$$

where $\sigma_i$=variance of error of measurement $$\Delta = SS_{sy} - S_x^2$$

Restated then, for each measurement point (xm,ym), the path loss trend is found with:

$$PLT(xm,ym) = a*\log_{10}x + b$$

Therefore, to find the path loss residual, the formula $$PLR(xm,ym) = PLm(xm,ym) - PLT(xm,ym)$$

is applied to subtract the path loss trend at each bin from the path loss measurement at the same bin.

Non-stationarity is expected because the Path Loss (signal) decays in free space and is approximately 20 $\log_{10}[R]$, where R is the distance from the aritenna. Assumptions for the purposes of the merge process are that the computations result in quasi-stationary residuals. The trend is also assumed to be omni-directional in spatial continuity. The assumption does not imply a belief that spatial continuity is the same for the trend in all directions. The assumption serves the use of focusing on distance parameters of the trend for simplified calculations. The assumption can be modified to include directional trends if the trend is derived in each direction.

Kriging the residuals at the bins is step three 70 of the merge process. Prior to kriging, a variogram, such as the exemplary variogram 72 in FIG. 10, describing the system's spatial continuity is developed or assumed. In the exemplary embodiment, variogram 72 properties are known through a catalogue of different type of path loss spatial behavior. These assumptions can be optional depending on their relevancy to new data sets. Methods to overcome the assumptions include using the non-stationary geostatistical framework as an alternative. Such an alternative requires development of a generalized variogram within the framework of the Intrinsic Random Function (IRFk) theory.

The variogram $\lambda_{(h)}$ term is a measure of dissimilarity, or increasing variance as a function of distance. The variogram is the sum of the squared differences of all data pairs falling within a lag divided by twice the number of pairs found for that lag. Computing and plotting $\lambda_{(h)}$ as a function of increasing lag distance, h, results in a plot of the experimental variogram 72.

Figure 10:
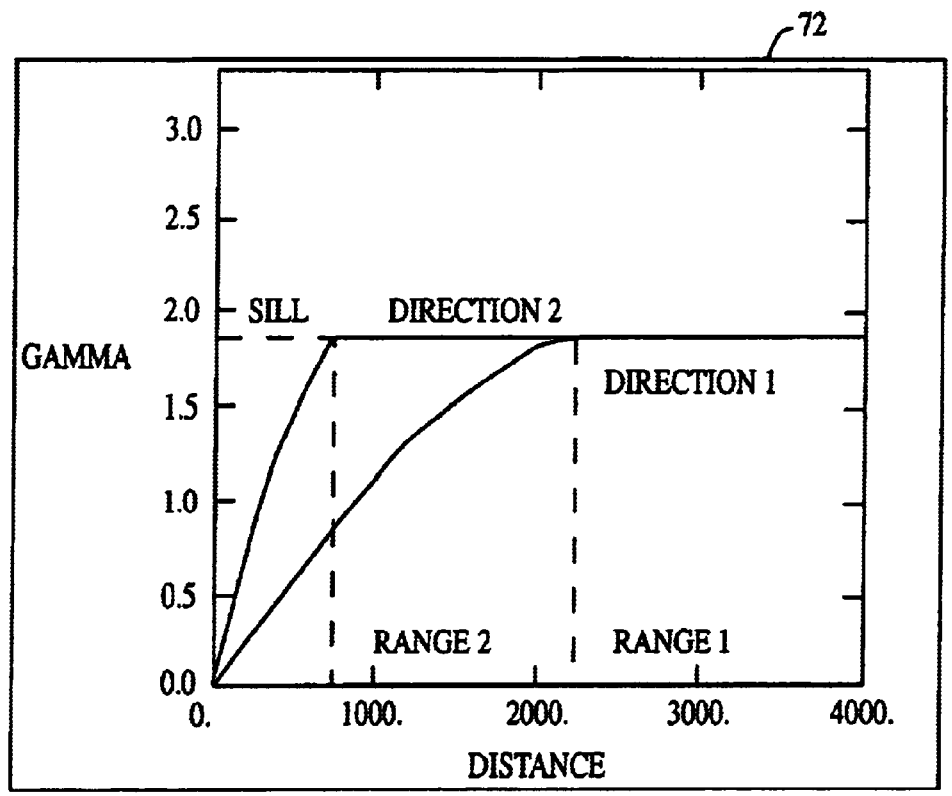
FIG. 10 is an illustration of a variogram having decreasing correlation with distance.

With increasing distance, $\lambda_{(h)}$ tends to reach a constant value known as the sill. For a variogram, the sill is the variance ($\sigma^2$) of the measured data. The distance at which the sill is reached by the variogram is called the range or correlation length. The sill and range are useful properties when comparing directional trends in the data. FIG. 10 illustrates a hypothetical anisotropic variogram 72 showing a short scale correlation range of 800 meters and a long scale range of 2200 m.

In an alternative exemplary embodiment, parameters of the variogram are modeled from the data set. The steps to variogram modeling are run a variogram on collected data, feeding the variogram to theoretical model, and fitting the variogram to the measured data's variogram. For each azimuth and lag (separation) distance studied, all measured values can be spatially correlated and expressed as the statistical value known as the variogram, and is calculated using the following expression:

$$\gamma_{(h)} = \frac{\sum [Z_{(xi)} - Z_{(xi+h)}]^2}{2n}$$

where:

$Z_{(xi)}$=the sample location at xi
$Z_{(xi+h)}$=the sample location at xi+the lag distance, h
n=the number of data pairs In an additional alternative embodiment, different experimental variograms are computed, including near range, long range anisotropic and long range omni-directional. Better predictions can be made by accounting for anisotropy in the data. Anisotropic variograms account for scalar distance in one direction, all measured with the same distance between pairs of data points. The near range variogram and long range variograms for RF signal measurements demonstrate that RF data has an inherent trend of diminishing power as a function of distance. Data with an inherent trend is referred to as non-stationary and will tend not to flatten at the sill (variance=1.0), rather it continues to increase in variance with distance. Non-stationarity is expected because path loss decays in Free Space as approximately 20 $\log_{10}[R]$, where R is the distance from the antenna. Correct variogram modeling requires modeling residuals to avoid biasing the interpolated values during geostatistical analysis of the data.

In an additional alternative embodiment, finding a universal variogram is based on the entire set of data from all cellular system sectors that has been reduced by the dimensionality of the process. A wireless system may theoretically contain hundreds of sectors. Instead of modeling each sector, lists of correlated sectors are made. The principal component analysis is applied to reduce each correlated sector list to a representative component. This method can reduce the number of variogram models by orders of magnitude.

Kriging is a geostatistical interpolation technique applied through computer software solutions. The preferred embodiment implements the merge process through customized software code to process input RF data from the merged database and output path loss measurements estimated at the global bin locations. The merge process is applied to thousands of sectors that can be efficiently performed on a computer. Kriging is a linear weighted-averaging method, similar to inverse weighted distance, but kriging weights depend upon a model of spatial correlation, the variogram model. Kriging uses the variogram to estimate variability. If a data point is unknown, the weights and values from neighboring points are calculated to find the unknown point of interest. Kriging eliminates bias by accounting for the spatial correlation of the neighboring points in addition to the distances from the point of interest.

Figure 11:
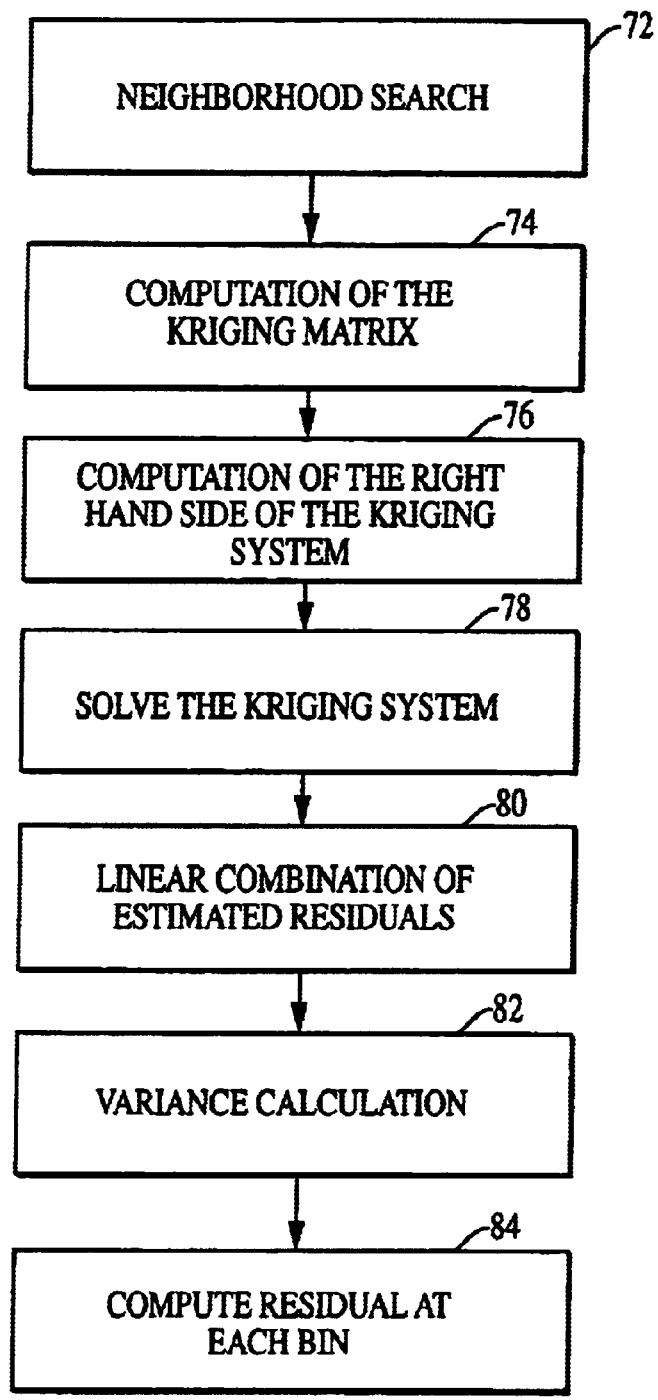
FIG. 11 is a flowchart of step three of the merge process applying a geostatistical model to RF signal strength data.

Step three 70 of the merge process is illustrated in the flowchart of FIG. 11. The neighborhood search 72 finds data points within a defined area of interest. For anisotropic data, the area of interest is typically an elliptic shape centered on the bin 48 of interest. The orientation of the ellipse is dictated by the anisotropy in the pattern of spatial continuity. The major axis of the search ellipse is oriented on the RF signal data that are more continuous in one direction than another. There is no determinative size to the area of interest or how many samples to include. The next step is the computation of the kriging matrix 74 followed by the computation of the right hand side of the kriging system 76. The left hand side of the matrix depends on the mutual location of the RF data points present in the neighborhood of the target point. The right hand side of the kriging matrix depends on the location of the data points of the neighborhood with regard to the location of the target point. Both left and right hand sides of the matrix must be established each time. The vector of the kriging weights are obtained by solving the kriging system 78 of the linear combination of the estimated residuals 80 using the neighbors' and their weights. Finally, the variance of the path loss 82 and the residual 84 at each bin 48 location are calculated.

Step four 86 of the merge process 58 concludes the kernel with estimations of the trend at the bins 48 and adding the estimated value of the residual. The path loss trend at the bins is then computed. The kriged residual is then added back to the path loss trend. This results in the computation of the kriged path loss for a specific bin location on the grid.

Figure 12:
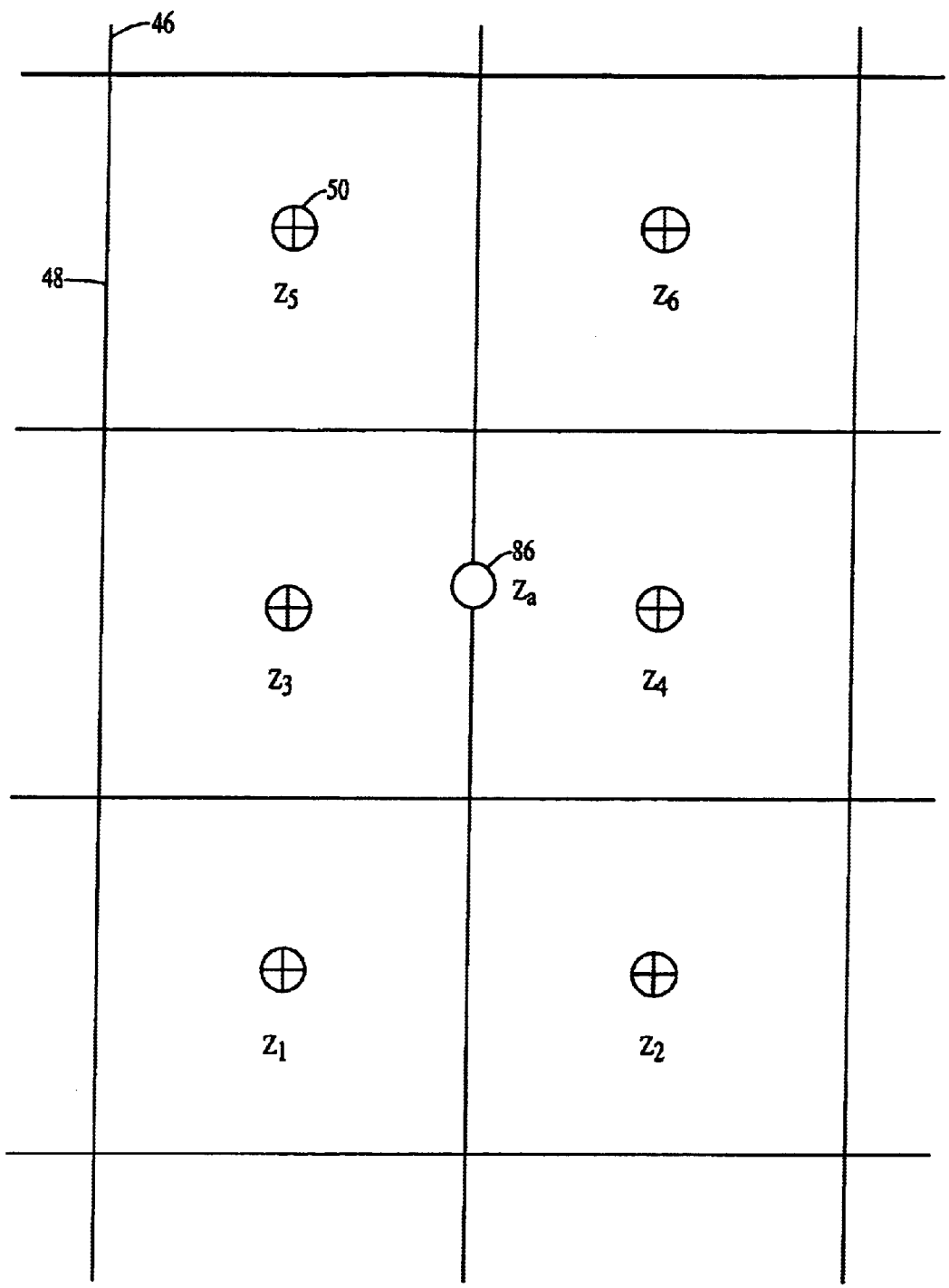
FIG. 12 is an illustration of finding an unknown data point using interpolation techniques.

The resulting ability to calculate path loss at a geographic point within the model grid 46 is illustrated in FIG. 12. Exemplary bins 48 are illustrated with grid lines 46. Data value in the center of each bin 50 are labeled $Z_1$ through $Z_6$. Point $Z_a$ 88 is a geographic point, for example a point located on a road of the basemap, where a path loss measurement is unknown but desired. Values $Z_1$ through $Z_6$ are the neighboring data points chosen for the kriging process. After kriging the neighborhood, weights are calculated for each bin count. The following equation is then applied to find the RF path loss value at $Z_a$:

$$Z_a = \sum \lambda Z_i$$

where $Z_1$ are the values of counts $Z_1$ through $Z_6$ and $\lambda$ is the weighting factor for each count. After summing the values from the equation, an estimation of the previously unknown RF path loss data value at $Z_a$ calculated and reported.

Figure 13:
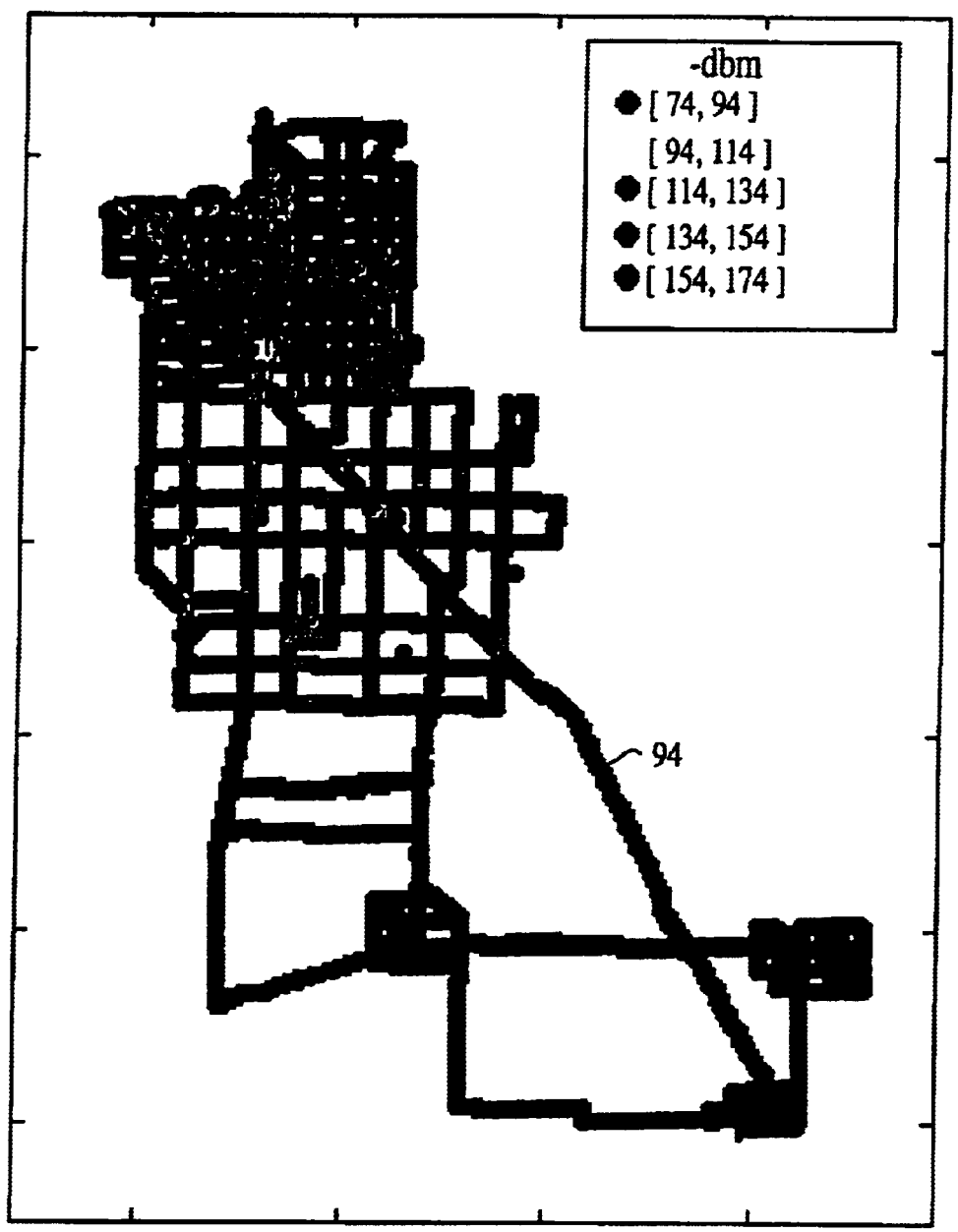
FIG. 13 is an exemplary graphical view illustrating the results of the geostatistical method to the data of FIG. 8.

Reporting the results 90 is the last step of the merge process. Outputs can be customized depending on the requirements for engineering analysis and goals of optimizing a wireless network. The kriging error of the path loss can also be measured and output 92 as a report. An example of output data from the merge process can include histograms estimated at each bin location, probability maps showing the probability above or below a given cut-off, and risk maps estimating the value of path loss for a given probability number from 0 to 100%. FIG. 13 illustrates a graphical representation 94 of estimated path loss data for the drive path illustrated in FIG. 4.

Quality control outputs of the merge process keep an account of the process of the kernel as it proceeds through the modeling processes. These outputs include progress indicators of the merge process steps, progress indicators of the merge process steps in percent of completion, and statistics of the success of the Merge process for each sector analyzed.

Validation of the model compares the estimated values with measured values. If kriged estimates are unbiased, then averages of the estimated and measured values should be equal. This method is further discussed in copending application Ser. No. 09/567,709 to the same assignee as the present application, and is incorporated herein by reference as if fully set forth herein.

The final steps of the flowchart in FIG. 3 are to apply the modeled parameters to a basemap 96 and output the results 98. A goal of finding the kriged path loss is to find the wireless signal data at bins for which no data was collected, the data is questionable, missing, corrupted, or otherwise unusable. To estimate an unknown data value at specific locations, a weighted linear combination is used. The weights take into account possible clustering and account for distance to the nearby samples. Geographically dispersed data values receive greater emphasis in the path loss interpolations than clustered points. Estimations can be a global cumulative distribution, local distribution, or individual data element. The ability to accurately identify areas of interference of cellular channels using geostatistical modeling. Using the merge process of the preferred embodiment, a high confidence level of the quality of the data can be gained. With the ability to accurately estimate a data value at any point in the cellular system, the geostatistical model can accurately identify areas where interference between channels is occurring and the sources of the interference.

Another application of the exemplary embodiment of geostatistical modeling of cellular system RF data is to accurately determine the likely server area in a sector. The likely server in a sector is the base station that has the strongest signal in a sector to serve a mobile subscriber unit while the unit is located within that sector. To give the mobile unit uninterrupted service over a wide area, the service area of each cell overlaps the service area of adjacent cells. Within the overlapping areas, one of two or more base stations might serve a mobile subscriber unit. Service areas are discussed in copending application Ser. No. 08/887101 Improving a Cellular System to the same assignee as the present application, and is incorporated herein by reference as if fully set forth herein. Through geostatistics, an accurate measurement of the likely server area for a sector can be determined. The geostatistical model can also determine the propagation model for an adjacent sector's server area and total propagation area, and server areas and propagation areas from other cells. The likely server area of the sector of interest receives interfering signals from other server's signal propagation. Using geostatistics, interfering propagation signals from multiple service areas are modeled and interfering sources and signal propagation determined, thereby providing superior methods to optimize the cellular network.

Geostatistical modeling can determine where data measurements are lacking in a cellular system and site locations where greater data acquisition is needed. Drive testing a cellular system gathers data from only a fraction of total roads in a cellular system. Data from certain geographic areas within a cell system may yield questionable or inconclusive results after modeling, or data gaps may occur due to interference or topographic factors. Geostatistical modeling of these data areas using the merge process of the preferred embodiment yields numerical and graphical results displayed on a basemap of the system that a system planner can use to accurately determine the locations in the system that require greater data acquisition in subsequent drive tests.

A further utilization of the geostatistical modeling of RF data is identifying variations in the network caused when signal strength or direction of the antenna has been modified, or new interference is propagated, into a sector. Cellular division and frequency reuse depend upon adjusting the angle and tilt of antennas correctly at a base station, creating a server area that minimizes propagation interference of nearby channels. Changes in the angle and tilt of an antenna can be identified and graphed using geostatistical techniques. After analyzing and graphing a first set of drive test data with geostatistics, a subsequently acquired set of drive test data from the same sectors that has been similarly analyzed and graphed can be compared to the prior data set for changes in signal propagation. A geostatistical model of a cellular network also provides the ability to look beyond a reactionary view to changes in a cell network and accurately predict propagation models of the effects from adjusting angles and tilts. By predicting server areas and propagation models geostatistical techniques as implemented in the merge process can greatly reduce the iterations of adjustments of antennas necessary to reduce the propagation interference to other sectors while keeping respective service areas free from interference.

Geostatistical modeling offers an additional enhanced reporting mechanism to enable a carrier's management team to track and trend growth within a wireless network. Frequency optimization demands the ability to track, trend, and forecast service quality and capital efficiency within a wireless network. Using measured network data and geostatistical modeling techniques, the merge process methodology provides the ability to obtain a graphical and numerical view of optimal frequency plans for cellular networks under different variables. The models can determine the optimal frequency plan based on the current traffic demands and the projected traffic growth.

Although the present invention has been described interns of preferred embodiments, it will be appreciated that various modifications and alterations, might be made by those skilled in the art without departing from the spirit and scope of the invention. The above-described exemplary embodiments are therefore intended to be illustrative in all respects, rather than restrictive, of the present invention. Thus the present invention is capable of many variations in detailed implementation that can be derived from the description contained herein. All such variations and modifications are considered to be within the scope and spirit of the present invention as defined by the following claims.

What is claimed is:

1. A method for assessing RF propagation in a wireless communication system comprising the steps of:

collecting measured RF path loss data within said wireless communication system corresponding to known geographic locations within said wireless communication system;

interpolating said measured RF path loss data;

establishing a data set of interpolated path loss signal strength levels from said collected measured RF path loss data; and casting a final RF propagation data set including said measured data for said known geographic locations and selected data points from said interpolated data set for geographic locations having no corresponding measured data; and wherein the weights of dispersed neighboring data values are equilibrated to elustered neighboring data values for interpolating said measured RF path loss data interpolation.

2. A method for assessing RF propagation in a wireless communication system according to claim 1, further comprising:

interpolating a plurality of data sources utilizing the variance of said data sources to weight the significance of said data.

3. A method for assessing RF propagation in a wireless communication system comprising the steps of:

collecting wireless signal data comprised of a plurality of data elements for one or more wireless base stations;

associating the data elements of said wireless signal data with geographic locations corresponding to a location at which each said data element was gathered;

associating said data elements with a source;

applying an interpolation model to said wireless signal data base on a spatial continuity analysis; and using said interpolation model to manage a wireless network;

wherein said step of associating said data elements with a source includes identifying a digital identification code within said wireless signal data.

4. A method for assessing RF propagation in a wireless communication system according to claim 3, wherein;

said step of identifying a digital indentification code includes utilizing a rapid color code decoder to increase the probability of obtaining information under adverse conditions.

5. A method for assessing RF propagation in a wireless communication system according to claim 3, wherein said applying an interpolation model includes applying a linear weighted-averaging method depending upon a model of spatial correlation.

6. A method for assessing RF propagation in a wireless communication system according to claim 3, further comprising the steps of:

defining a spatial trend in said gathered wireless signal data;

defending said wireless signal data by filtering said spatial trend from said wireless signal data thereby creating defended wireless signal data; and utilizing said detrended wireless signal data in the step of said applying a geostatistical an interpolation model to said wireless signal data.

7. A method for assessing RF propagation in a wireless communication system according to claim 3, wherein:

said step of applying an interpolation model includes:

creating a model consisting of a plurality of bins overlaying at least part of said wireless communication system;

creating a second residual data set by removing a spatial trend from said wireless signal data at each said bin;

interpolating said second residual data set using geostatistical techniques thereby creating and interpolated residual data set;

adding said spatial trend data to said interpolated second residual data set; and reporting wireless signal path loss estimations at said bius.

8. A method for assessing RF propagation in a wireless communication system according to claim 7, wherein:

said step of interpolating said second residual data set using geostatistical techniques includes kriging, cokriging, kriging with external drift, or colocation cokriging to calculate path losses of said wireless signal data.

9. A method for assessing RF propagation in a wireless communication system according to claim 8, wherein said geostatistical techniques include:

searching a neighborhood of values of said wireless signal data near a bin;

computation of computing a kriging matrix;

finding the weights of linear combinations of said neighboring values of said wireless signal data and weights of said neighboring values of said wireless signal data;

calculating the a variance of an estimation of the path loss; and computing the an estimated residual data point at a bin location.

10. A method for assessing RF propagation in a wireless communication system, comprising the steps of:

creating a model consisting of a plurality of bins overlaying at least part of a wireless system;

collecting wireless signal data from one or more wireless base stations thereby creating collected wireless signal data;

creating residuals by removing a spatial trend from said data at said bins;

modeling said residuals with an interpolation technique based on spatial continuity analysis thereby creating modeled residuals;

adding said spatial trend to modeled residuals; and reporting modeled path loss data at said bins.

11. The method of claim 10, wherein said step of creating residuals by removing a spatial trend from said wireless signal data includes:

recognizing a spatial trend in said gathered collected wireless data;

detrending said wireless signal data by filtering said spatial trend from said wireless signal data thereby creating detrended data; and utilizing said detrended data in said step of modeling said residuals with an interpolation technique to said wireless signal data.

12. A method for assessing RF propagation in a wireless communication system according to claim 10, wherein:

said step of modeling said residuals with an interpolation technique based on spatial continuity analysis includes modeling with geostatistical interpolation techniques.

13. A method for assessing RF propagation in a wireless communication system according to claim 12, wherein:

said step of modeling said residuals with an interpolation technique includes at least one of the group comprised of kriging, cokriging, kriging with external drift, and colocation cokriging to calculate path losses of said wireless signal data.

14. A method for assessing RF propagation in a wireless communication system, comprising the steps of:

collecting data sets of measured path loss signal strength levels gathered from within said wireless communication system from known geographic locations within said wireless communication system; and analyzing said data sets using multivariate statistical techniques;

deriving independent parameter sets from said multivariate statistical analysis of said data set for input into a plurality of propagation models of said data sets, each said model corresponding to one of said multivariate statistical analysis.

15. A method for assessing RF propagation in a wireless communication system according to claim 14, wherein:

said multivariate statistical analysis includes multivariate geostatistical analysis techniques.

16. An apparatus for assessing RF propagation in a wireless communication system comprising:

wireless receiving equipment for gathering wireless signal data comprised of a plurality of data elements from one or more wireless base stations thereby creating gathered wireless signal data;

geographic location equipment connected to said wireless receiving equipment for associating the data elements of said wireless signal data with geographic locations corresponding to the a location at which each said data element was gathered;

signal strength measuring equipment for determining the signal strength of each element of said gathered data thereby creating measured data;

digital decoding equipment for indentifying a digital indentification code within said gathered data; and a processor for establishing a data set of interpolated path loss signal strength levels form said collected gathered wireless signal data; and creating a final RF propagation data set including said measured data for known geographic location and selected data points from said data set of interpolated path loss signal strength levels for geographic locations having no corresponding measured data; and wherein the weight of dispersed neighboring data values are equilibrated to elustered neighboring data values for establishing a data set of interpolated path loss signal strength levels.

17. An apparatus for assessing RF propagation in a wireless communication system according to claim 16, wherein said processor interpolates a plurality of data sources utilizing the a variance of said data sources to weight the significance of said data.

* * * * *